US009335486B2

(12) United States Patent
Klimowych et al.

(10) Patent No.: US 9,335,486 B2
(45) Date of Patent: May 10, 2016

(54) METHOD AND APPARATUS FOR ALIGNING A LARGE DIAMETER OPTICAL FIBER

(71) Applicant: AFL TELECOMMUNICATIONS LLC, Duncan, SC (US)

(72) Inventors: William Raymond Klimowych, Greenville, SC (US); Toshirou Mizushima, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 109 days.

(21) Appl. No.: 14/373,074

(22) PCT Filed: Jan. 22, 2013

(86) PCT No.: PCT/US2013/022536
§ 371 (c)(1),
(2) Date: Jul. 18, 2014

(87) PCT Pub. No.: WO2013/110066
PCT Pub. Date: Jul. 25, 2013

(65) Prior Publication Data
US 2015/0055918 A1    Feb. 26, 2015

Related U.S. Application Data

(60) Provisional application No. 61/588,866, filed on Jan. 20, 2012, provisional application No. 61/588,885, filed on Jan. 20, 2012.

(51) Int. Cl.
*G02B 6/255* (2006.01)
*G02B 6/38* (2006.01)
*G02B 6/42* (2006.01)

(52) U.S. Cl.
CPC ............ *G02B 6/3803* (2013.01); *G02B 6/2555* (2013.01); *G02B 6/4221* (2013.01)

(58) Field of Classification Search
CPC .... G02B 6/3803; G02B 6/421; G02B 6/4221; G02B 6/4222; G02B 6/4225; G02B 6/4226; G02B 6/2555; G02B 6/3588
See application file for complete search history.

(56) References Cited

U.S. PATENT DOCUMENTS

| | | | |
|---|---|---|---|
| 4,390,897 A * | 6/1983 | Smithgall, Sr. | ......... C03C 25/18 250/550 |
| 6,034,718 A | 3/2000 | Hattori | |
| 2002/0159724 A1 | 10/2002 | Oki et al. | |
| 2004/0202407 A1 | 10/2004 | Hoke | |
| 2007/0201033 A1 * | 8/2007 | Desjardins | ......... G01N 21/4795 356/497 |
| 2009/0010601 A1 | 1/2009 | Huang et al. | |
| 2009/0214166 A1 | 8/2009 | Huang et al. | |

OTHER PUBLICATIONS

International Search Report for PCT/US2013/022536 dated Mar. 22, 2013.

* cited by examiner

*Primary Examiner* — Michelle R Connelly
*Assistant Examiner* — Hoang Tran
(74) *Attorney, Agent, or Firm* — Dority & Manning, P.A.

(57) ABSTRACT

A method for aligning an optical fiber that includes: directing a laser beam into a beam splitter to generate a pair of beams that are directed to a pair of reflectors that redirect the pair of beams such that the pair of beams intersect with each other and go to a pair of power detectors; and moving an optical fiber into the paths of the pair of beams until power detected at each of the pair of detectors is minimized.

8 Claims, 2 Drawing Sheets

METHOD AND APPARATUS FOR ALIGNING A LARGE DIAMETER OPTICAL FIBER

CROSS-REFERENCE TO RELATED APPLICATIONS

This application is based upon and claims the benefit of priority from U.S. Provisional Application Nos. 61/588,866, filed Jan. 20, 2012, and 61/588,885, filed Jan. 20, 2012, in the United States Patent and Trademark Office, the disclosures of which are incorporated herein in its entirety by reference.

BACKGROUND

1. Field

The invention is related to a method and apparatus for aligning a large diameter optical fiber, and more particularly to a method and apparatus for aligning a large diameter optical fiber that uses a pair of power detectors.

2. Related Art

There are several instances in which it is necessary to align optical fibers. For example, to achieve low loss splices when axial splicing two fibers together it is important to make certain that they are perfectly aligned with each other. If they are not aligned, optical power can be lost at the splice point. Materials, other than glass, may also be aligned and processed, such as stripping insulation, and ablating materials.

A conventional method for aligning large diameter fibers (fibers that are larger than approximately 1 mm in diameter, is to use an XY camera system to "see" the fiber along with a feedback system linked to an XYZ motor controllers or drivers.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

An embodiment of the invention is a method for aligning a large diameter optical fiber that includes: directing a laser beam into a beam splitter to generate a pair of beams that are directed to a pair of reflectors that redirect the pair of beams such that the pair of beams intersect with each other and go to a pair of power detectors; and moving an optical fiber into the paths of the pair of beams until power detected at each of the pair of detectors is minimized.

Another feature of this embodiment is to use a camera to align the fiber.

Another embodiment of the invention is an apparatus for aligning a large diameter optical fiber that includes: a laser source; a beam splitter; a pair of reflectors; a pair of detectors; and a fiber moving structure; wherein the laser beam is directed into the beam splitter to generate a pair of beams that are directed to the pair of reflectors that redirect the pair of beams such that the pair of beams intersect with each other and go to the pair of power detectors; and wherein the fiber moving structure is configured to move an optical fiber into a location where the pair of beams intersect.

Another feature of the embodiment includes the apparatus also having a collimating telescope in a path between the laser source and said beam splitter and a controller connected to the pair of detectors and the collimating telescope, and wherein the controller is connected to the fiber moving structure.

Another feature of the embodiment includes the apparatus also having a pair of cameras positioned so that each camera points to the location where the pair of beams intersect and the controller is connected to said pair of cameras.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
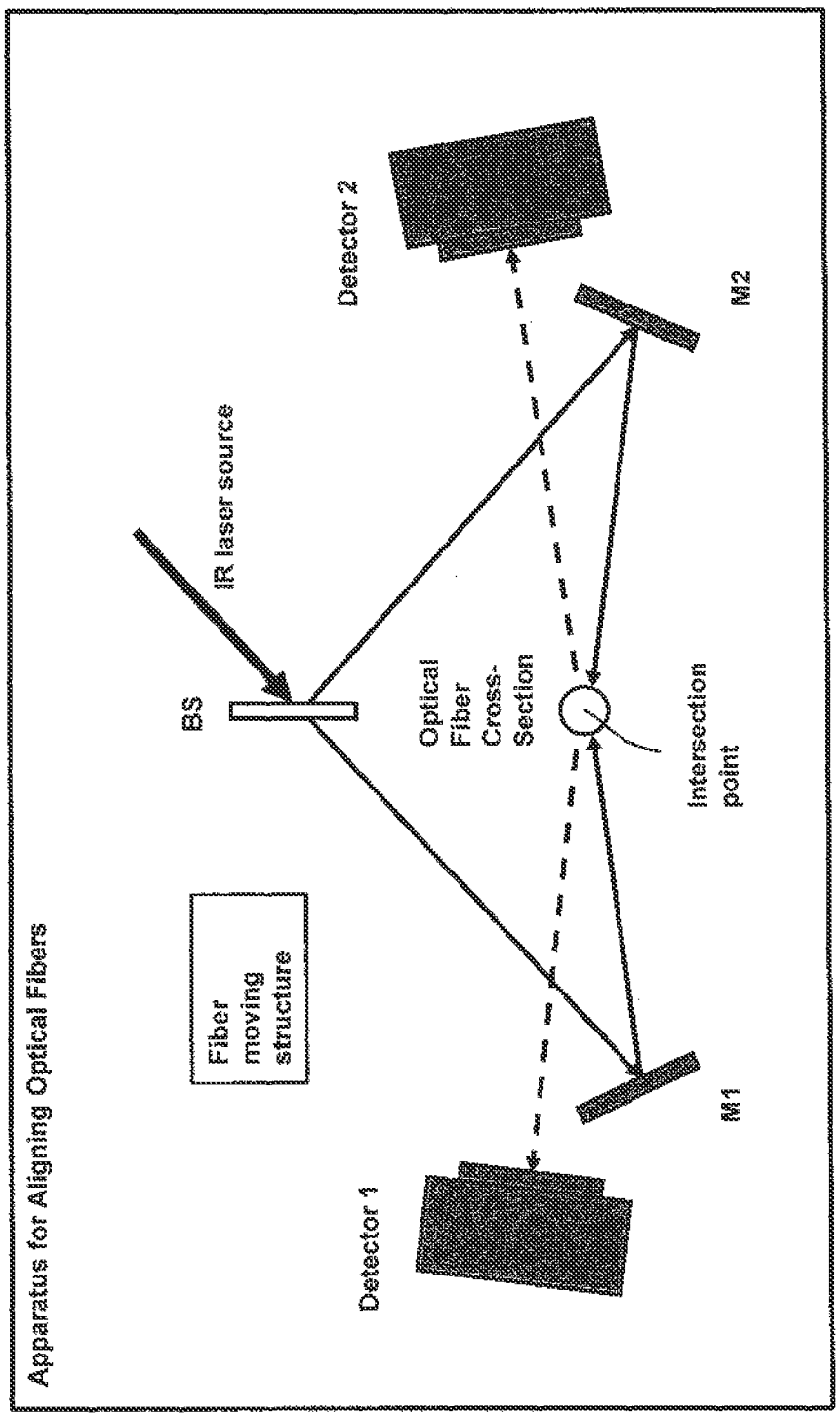
FIG. 1 shows an exemplary embodiment of an apparatus for aligning optical fibers.

FIG. 1 shows an exemplary embodiment of an apparatus for aligning optical fibers according to the invention. The apparatus could be provided as part of an optical fiber splicer, such as the AFL LZM100. The apparatus includes a pair of detectors (detector 1, detector 2), such as thermopile power detectors, a $CO_2$ laser source (Infrared (IR) coherent sources, between 190 nm to 20 µm, such as Nd:YAG lasers (760 nm), can be used as well, providing they within the range of the power meter), two reflectors, M1, M2, such as mirrors, and a beam splitter BS. FIG. 1 shows the cross-section of an optical fiber that is in an aligned position. The optical fiber is held by a movable structure that can move the optical fiber so that it can be aligned.

Next, the operation of the apparatus will be described. The IR laser source generates a laser beam that is directed to beam splitter BS. The angle of the laser beam to beam splitter BS is set such that the beam is split into two beams that are 90 degrees apart. One beam is directed to reflector M1, which redirects the beam to detector 2. The second beam is directed to reflector M2, which redirects the beam to detector 1. The reflector are set up so that the redirected beams intersect as to go to the detector. The intersection point is also the position where the optical fiber is to be aligned.

A typical diameter width of the lasers is approximately 2.5 mm. The invention work best if the diameter of the laser beam is not smaller in size than the diameter of the fiber being aligned.

When the optical fiber is not in the aligned position and does not interfere with the beams, all of the energy of the laser beams will be directed to the detectors, producing a maximum power reading. As the optical fiber is moved closer to the point of intersection, the power directed to the detectors will decrease as the optical fiber absorbs some of the beam energy. The optical fiber is moved until the power is minimized at both detectors, which indicates that the optical fiber is at the aligned position. The movement can be done manually, or automatically if the movable structure and detectors are connected to a controller.

An added benefit of this configuration is that when an optical fiber is not in the aligned position, the detectors can be used to calibrate and monitor the laser so that optimal power for processing optical fibers is supplied. The detectors can also act as beam blocks as a safety measure.

Figure 2:
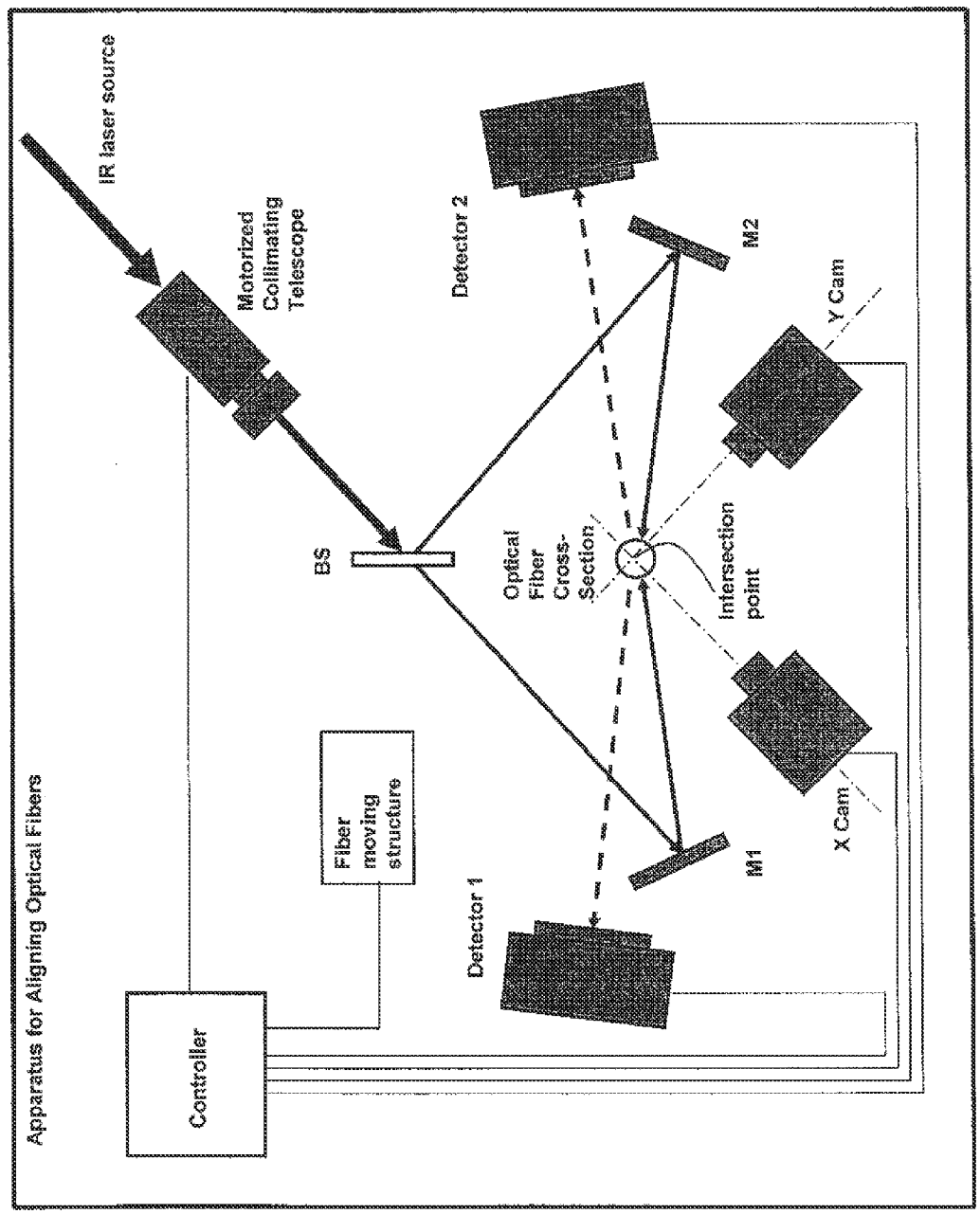
FIG. 2 shows another exemplary embodiment of an apparatus for aligning optical fibers.

FIG. 2 shows a second exemplary embodiment of an apparatus for aligning optical fibers according to the invention.

The apparatus could also be provided as part of an optical fiber splicer, such as the AFL LZM100. The apparatus includes a pair of detectors (detector 1, detector 2), such as thermopile power detectors, a $CO_2$ laser source (Infrared (IR) coherent sources, between 190 nm to 20 µm, such as Nd:YAG lasers (760 nm), can be used as well, providing they within the range of the power meter), two reflectors, M1, M2, such as mirrors, and a beam splitter BS, two cameras (X Cam, Y cam), a motorized collimating telescope and a controller. FIG. 2 shows the cross-section of an optical fiber that is in an aligned position. The optical fiber is held by a movable structure (not shown) that can move the optical fiber so that it can be aligned. The controller is connected to the detectors, cameras, motorized collimating telescope and movable structure to move and adjust the components and analyze data collected by the components.

Next, the operation of the apparatus will be described. The IR laser source generates a laser beam that is directed to a motorized collimating telescope, such as a collimating telescope with ZnSe optics, although other collimating telescopes could be used. The motorized collimating telescope is used to control the laser's beam width and power density by rotating and/or translating the optics. While this embodiment shows a motorized collimating telescope, a non-motorized collimating telescope that is manually adjusted could also be used. The beam that passes through the motorized collimating telescope is directed to beam splitter BS. The angle of the laser beam to beam splitter BS is set such that the beam is split into two beams that are 90 degrees apart. One beam is directed to reflector M1, which redirects the beam to detector 2. The second beam is directed to reflector M2, which redirects the beam to detector 1. The reflector are set up so that the redirected beams intersect as to go to the detector. The intersection point is also the position where the optical fiber is to be aligned. The two cameras are positioned so that they are pointed to the intersection point.

A typical diameter width of the lasers is approximately 2.4 mm. The invention works best if beam is larger than the largest fiber used. The large beam can also work with smaller fibers.

When the optical fiber is not in the aligned position and does not interfere with the beams, all of the energy of the laser beams will be directed to the detectors, producing a maximum power reading. As the optical fiber is moved closer to the point of intersection, the power directed to the detectors will decrease as the optical fiber absorbs some of the beam energy. The optical fiber is moved until the power is minimized at both detectors, which indicates that the optical fiber is at the aligned position. The movement can be done manually, or automatically if the movable structure and detectors are connected to a controller.

The cameras can be used to further fine tune the alignment.

As in the embodiment in FIG. 1, an added benefit of this configuration is that when an optical fiber is not in the aligned position, the detectors can be used to calibrate and monitor the laser so that optimal power for processing optical fibers is supplied. The detectors can also act as beam blocks as a safety measure.

As mentioned above, although the exemplary embodiments described above are various methods for creating tapers in an optical fiber, they are merely exemplary and the general inventive concept should not be limited thereto, and it could also apply to other types of tapers or shapes of fibers.

What is claimed:

1. A method for aligning an optical fiber comprising:
    directing a laser beam through a collimating telescope into a beam splitter to generate a pair of beams that are directed to a pair of reflectors that redirect said pair of beams such that said pair of beams intersect with each other and go to a pair of power detectors; and
    moving an optical fiber into the paths of said pair of beams until power detected at each of said pair of detectors is minimized;
    wherein said pair of detectors and collimating telescope are controlled by a controller.

2. A method of claim 1 further comprising using a camera to align the optical fiber.

3. An apparatus for aligning an optical fiber comprising:
    a laser source;
    a beam splitter;
    a pair of reflectors;
    a pair of detectors; and
    a fiber moving structure;
    a collimating telescope in a path between said laser source and said beam splitter; and
    a controller connected to said pair of detectors and said collimating telescope;
    wherein said laser beam is directed into said beam splitter to generate a pair of beams that are directed to said pair of reflectors that redirect said pair of beams such that said pair of beams intersect with each other and go to said pair of power detectors; and
    wherein said fiber moving structure is configured to move an optical fiber into a location where said pair of beams intersect.

4. The apparatus of claim 3, wherein said controller is connected to said fiber moving structure.

5. The apparatus of claim 3, further comprising a pair of cameras positioned so that each camera points to said location where said pair of beams intersect.

6. The apparatus of claim 5, wherein said controller is connected to said pair of cameras.

7. The apparatus of claim 6, further comprising a collimating telescope in a path between said laser source and said beam splitter.

8. The apparatus of claim 7, wherein said controller is connected to said collimating telescope.

* * * * *